Jan. 16, 1940.  A. J. GARDNER  2,187,514
FILTER
Filed Nov. 23, 1936
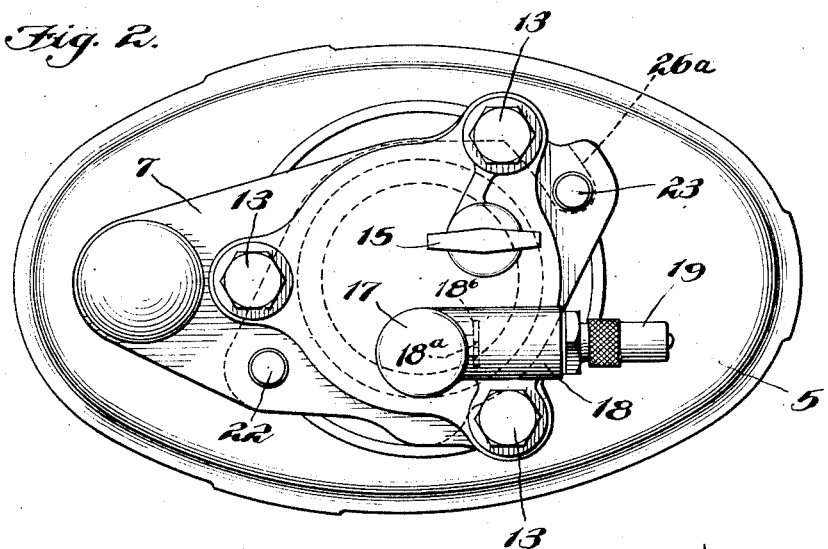
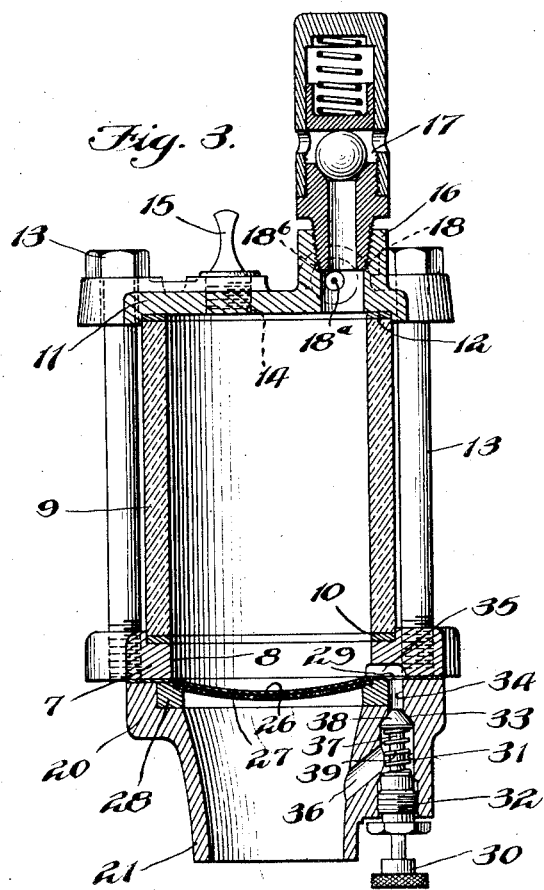
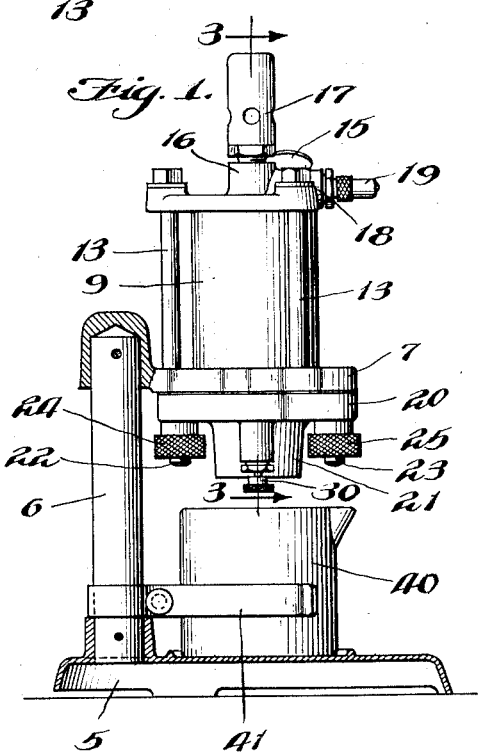
INVENTOR.
Anthony J. Gardner
BY Kent W. Worrell
ATTORNEY.

Patented Jan. 16, 1940

2,187,514

UNITED STATES PATENT OFFICE 2,187,514

FILTER

Anthony J. Gardner, Barrington, Ill.

Application November 23, 1936, Serial No. 112,222

6 Claims. (Cl. 73—51)

This invention relates in general to a pressure filter and has more particular reference to a device of this kind for testing, showing and exhibiting the dirt content of liquids, particularly of crank case oil from internal combustion engines.

An important object of the invention is therefore in the provision of a pressure filter of the sampling type which is pressure operated to speed the operation of the filter and to quickly produce a visible sample indication of the condition of a sample of oil taken from the crank case of an engine.

A further object of the invention is in the provision of means for quickly substituting a filter disk for each sample of oil to be tested. A still further object of the invention is in the provision of means for providing a discharging by-pass around the filter when the sample tested is too full of dirt.

A still further object of the invention is the provision of a portable oil sampling device which is actuated by air pressure, commonly obtained from a tire filling hose usually operated in connection with an oil and fuel filling station for automobiles.

In the accompanying drawing illustrating a preferred embodiment of this invention:

Figure 1 is a side elevation of a pressure filter in accordance with the invention, certain of the parts being shown in section;

Figure 2 is a top view of the device; and

Figure 3 is a sectional view.

In operating internal combustion engines, particularly automobile engines, it is highly desirable that the lubricating oil be kept as free from dirt, dilution and foreign particles as possible. Most engine and automobile operators do not know and cannot tell from the looks of the oil what is the actual condition of the oil. The present invention comprises a simple testing device into which a sample of the oil may be introduced, the sample being freely visible to observe the appearance of the oil, and a new filter disk being insertable for testing each sample either by allowing the oil to drip through the filter or to be forced therethrough under pressure. Provision is also made for by-passing any quantity of the oil from the visible portion around the filter to the discharge, when, for example, the oil is so dirty that it fills up the filter disk and takes too long to pass through the filter, or when it is desired for any other reason to discharge the remainder of the sample which is under test.

Referring now more particularly to the drawing, a filtering device of this kind is preferably mounted upon a supporting base 5 having a post 6 secured thereto and extending upwardly and carrying a supporting plate 7 at its upper end. This plate has a central opening 8 and a seat at the upper edge of the opening for a gauge glass 9 with a gasket 10 interposed between them and at the upper end of the gauge glass is a top plate 11 having a rim for seating the glass and holding a gasket 12 between them. These plates are held together with the gauge glass in position therebetween by bolts 13 inserted through the top plate and into the bottom plate, the gaskets making a fluid-tight connection.

In the top plate is a filling opening 14 closed by a finger removable plug 15 and an upwardly extending boss 16 having a pressure regulator 17 extending upwardly and with a lateral extension 18 having a spring closed check valve 19 adapted to receive a tire inflation hose. In the extension 18 is a partition 18b having a restricted aperture 18a to prevent a surge of pressure into the receptacle from the pressure hose.

At the bottom of the plate 7 is a discharge nozzle 21 and held tightly in place by studs 22 and 23 extending through the plates and knurled thumb nuts 24 and 25 adjustable thereon. These studs are anchored in the bottom plate 7 beyond the periphery of the gauge glass 9. One of the studs extends through an opening in the plate 20 upon which the plate is pivoted and the other stud 23 is seated in a notch or hook 26a at the opposite side of the plate 20 so that it may be rotated about the other stud 22 for the removal and insertion of a filter disk 26 which may be made of paper, gauze or any other suitable material, preferably of a nature to collect dirt and particles from the liquid tested and to show by contrast or comparison the condition of the liquid. This filter disk is preferably supported by a screen 27 seated upon a holding ring 28 in the upper portion of the fitting 20 so that it will not interfere with or obstruct the tight closing of the fitting 20 against the disk 26 which also forms a gasket or washer interposed between the bottom plate and the fitting 20 to make a fluid-tight connection.

At one side of the fitting 20 is a pressure release valve 30 seated in an opening 31 by means of a gland 32. The opening has a tapered valve seat 33 at its upper end from which a reduced passage 34 extends and registers with a release passage 35 extending from the inner edge of the plate opening 8 and having a bypass discharge opening 36 communicating with the interior of the discharge spout 21. The valve comprises a stem 37 having a tapered head 38 closing inwardly against the tapered valve seat 33, and a spring 39 surrounding the stem between the head and the packing gland tending to keep the valve in closed position. With a spring of proper pressure this valve operates as a safety release valve for the oil receptacle.

In the margin of each filter disk 26 is an opening 29 which registers with the opening of the bypass passage 34 and must be placed in register with it to afford a free passage of liquid from the receptacle through the passages 34 and 35 and also constitutes a sealing washer when the plate 20 is tightened against the bottom plate 7.

In operation, a new filter disc 26 is inserted at the bottom of the gauge glass by releasing the plate 20 by means of its screws 24 and 25 and rotating it outwardly; the filter disk is placed on the plate against the screen 27, its opening registering with the opening 34 in the plate, and the plate is closed and locked tightly by means of the thumb screws 24 and 25.

The pressure regulator 17 has a threaded cap or other suitable means for adjusting it and varying the pressure and thus it constitutes a pressure blow-off or release. The release valve 30 which is normally intended for manual operation but is held in closed position by its spring 39 may also act as a relief valve which automatically opens the bypass if the pressure in the filter receptacle becomes too great.

A liquid sample is introduced through the top opening 14 and the plug 15 is tightened therein. If the liquid under test is too thick, as in the case of some heavy oils, it is first diluted by mixing a quantity of gasoline therewith. When the liquid is in the filter receptacle its color and condition can be observed through the gauge glass 9.

If the liquid under test is thin so that it will pass readily through the filter 26 it may not be necessary to apply pressure to the filter receptacle but for heavy or thick liquids, or where it is desired to accelerate the passage of the liquid through the filter disk, pressure may be applied to the receptacle through the inlet valve 19 on top of the liquid. For automobile filling stations it is convenient to apply a tire inflation air hose to the filter by means of the plug 19.

After the filtering has continued a sufficient time or if the liquid does not pass rapidly through the filter disk 26 the release valve 30 may be manually operated by pulling it downwardly against the pressure of its spring 39 which will bypass the remainder of the liquid through the passages 35, 34 and 36, discharging it through the spout 21. The liquid sample thus discharged is preferably caught by a cup or receptacle 40 on the base 5 directly below the spout 21 and retained in place by a spring clip 41 which is secured around and supported by the posts 6.

With this testing device the appearance of the oil or other liquid can be observed at all times through the gauge glass, before it is inserted therein and after it passes through the filter, and the filter itself is removed from the fitting 20 for inspection and thus forms a visible exhibit of the condition of the oil. It collects metal filings and particles as well as dirt and clearly indicates to the engine operator the condition of oil in the crank case.

In the complete operation of this device as applied to an automobile engine, the method of operation comprises the withdrawing of a sample of oil from the crank case by means of a pressure bulb device, like a specific gravity tester, having a short hose section which is inserted into the bottom of the crank case, the bulb depressed and allowed to expand, withdrawing a sample of the oil; the hose is then withdrawn from the crank case and applied to the opening 14 and the pressure of the bulb ejects the sample into the filter.

Thus the engine owner can observe the entire operation, he can see the condition of the sample, and may judge for himself whether the condition of the oil warrants its removal or replacement.

Although particularly designed and intended for testing engine crank case lubricating oil, it is obvious this filter may be similarly operated for testing other liquids in the same way, the only necessary change probably being in the nature and character of the filter disk 26.

I claim:

1. A filter comprising a receptacle having a movable discharge spout at the bottom, means for supporting a filtering material at the top of the spout and at the bottom of the receptacle, means for mounting the spout to rotate about an axis at one side of and from the bottom of the receptacle to uncover the filtering element for insertion and removal and to tighten the spout with the filter element at the bottom of the receptacle, means for applying pressure to the receptacle, and a bypass in the spout with a spring pressed valve to relieve pressure in the receptacle.

2. In a pressure filter, a receptacle having a top with a closable filling opening and an air pressure inlet, a hinged bottom for the receptacle with a discharge opening therethrough, a screen at the top of the discharge opening, a filter element removably placed on top of the screen to receive residue from a liquid forced therethrough and through the screen by air pressure applied to the receptacle, and a pressure and surplus relief at the edge of the screen and filter element.

3. A structure in accordance with claim 2 in which the top is provided with a pressure regulator to limit the pressure applied to the receptacle and to the filter element.

4. A structure in accordance with claim 2 in which the bottom spout member is mounted at one side upon a pivoting stud and has a hook at the other side engaging another stud, and both of the studs having threaded nuts for tightening the bottom member in place at the lower end of the receptacle thus requiring a minimum threading movement of the studs to free the filter element and replace it.

5. A structure in accordance with claim 2 in which the pressure and surplus relief comprises a passage forming a bypass having a manually operable spring pressed closing valve for protecting the filter element and for discharging the contents of the receptacle around the filter element at the bottom thereof.

6. A pressure filter comprising a gauge glass having a perforated bottom plate and a top plate with a closable filling opening therein, means for clamping the glass tightly between the plates to form a pressure receptacle; a valved air pressure inlet and a pressure regulator attached to the top plate and communicating with the interior of the gauge glass, a discharge spout pivoted at one side of the bottom plate and rotatable to free the top of the spout from the bottom of the gauge glass, a screen at the top of the spout, a filter disk removably supported in the top of the spout by the screen thus locating the disk at the bottom of the gauge glass, means forming a bypass in the spout member and bottom plate around the screen and filter disk, a spring-pressed valve for normally closing the by-pass, and means for holding the spout member in fluid-tight engagement with the bottom plate so that pressure applied to liquid in the gauge glass will force it through the filter disk leaving any residue thereon.

ANTHONY J. GARDNER.